June 18, 1963 G. F. HAUSMANN 3,093,964
TWO-STAGE ROCKET
Filed Dec. 14, 1960
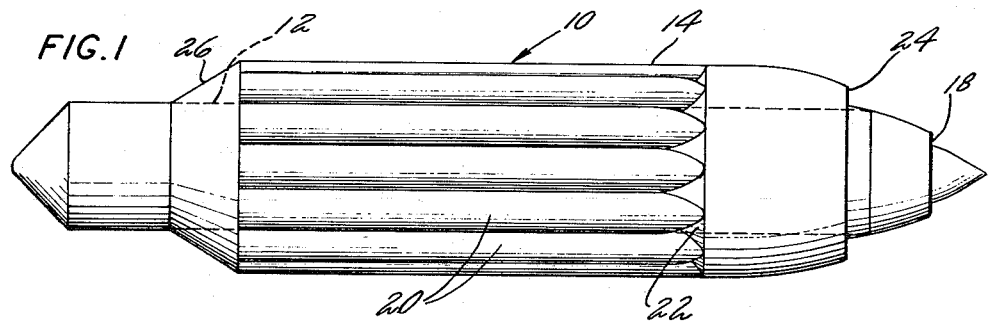
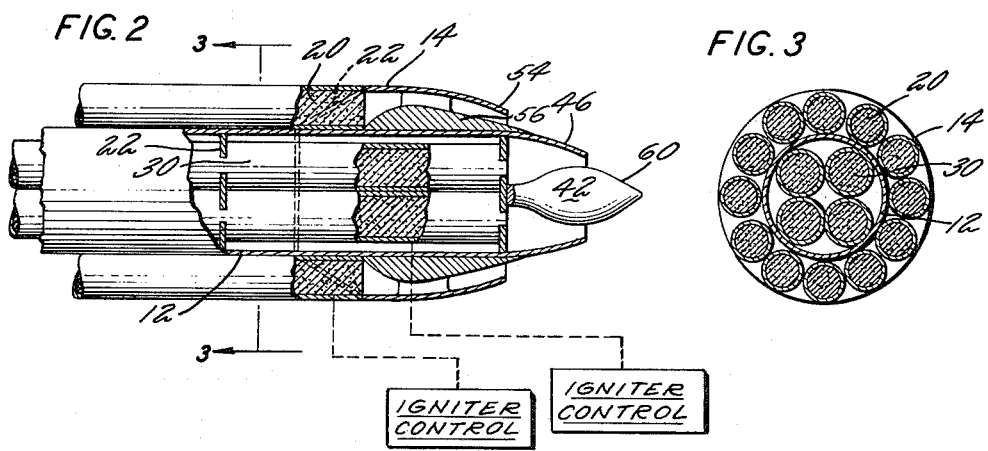
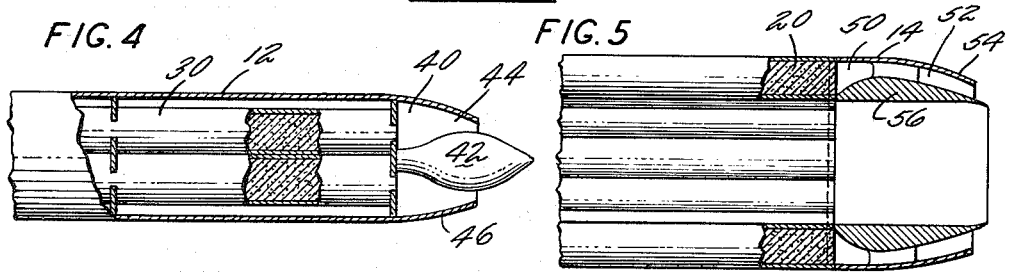
INVENTOR
GEORGE F. HAUSMANN
BY Leonard F. Weblind
ATTORNEY 3,093,964
TWO-STAGE ROCKET
George F. Hausmann, Glastonbury, Conn., assignor to United Aircraft Corporation, East Hartford, Conn., a corporation of Delaware
Filed Dec. 14, 1960, Ser. No. 75,849
7 Claims. (Cl. 60—35.6)

This invention relates to rockets and more particularly to light-weight multi-stage rockets.

It is an object of this invention to provide a multi-stage rocket assembly wherein several of the parts perform a common operative function for both of the rocket units.

It is a further object of this invention to provide a multi-unit rocket arrangement having inner and outer concentric units with each of the units forming, if desired, a cluster of individual cases of solid propellant with a portion of the aft end of the inner unit having a cooperative function with the exhaust nozzle of the outer unit whereby substantial weight saving is obtained.

These and other objects of this invention will become readily apparent in the following detailed description of the drawing in which:

FIG. 1 is a diagrammatic illustration of the assembled multi-unit rocket of this invention;

FIG. 2 is a partial showing and sectional illustration of the aft end of the assembled rocket unit;

FIG. 3 is a section taken along the line 3—3 of FIG. 2;

FIG. 4 is a partial sectional illustration of the inner rocket unit; while

FIG. 5 is a similar illustration of the outer rocket unit.

Referring to FIG. 1, the rocket assembly is generally illustrated at 10 as having an inner unit 12 coaxially disposed within a surrounding outer rocket unit 14. The inner unit 12 may have a nosecone 16 carrying any desirable payload and includes an exhaust nozzle 18. The outer unit 14 is comprised of a plurality of individual solid rocket casings 20 which may be supported by one or more suitable bulkheads 22 (see also FIG. 2). The outer unit 14 includes an exhaust nozzle opening 24.

To aid in streamlining during the first stages of operation through the atmosphere, a wind screen 26 may be provided.

As better seen in FIGS. 2 and 3, the outer unit 14 consists of a number of individual solid propellant charges or casings arranged in an annular cluster which provides for simplicity of arrangement and assembly as well as rigidity with a minimum of weight. The inner rocket unit 12 consists of a plurality of rocket elements 30 which are arranged in a circular array.

With the arrangement of this invention an essential advantage is obtained by the use of propellant cases which are of uniform and similar diameter grains which can be fabricated at a central facility and assembled at the launching site. Further advantage is obtained in the arrangement of the exhaust nozzles.

Thus it will be noted that for example as seen in FIG. 4 the individual grains or cases 12 exhaust into a common exhaust nozzle chamber 40 which contains a central plug 42 defining a converging nozzle portion 44. The plug 42 cooperates with the converging nozzle casing 46 to provide the proper throat configuration for the particular exhaust flow of the unit.

The outer rocket unit 14 as seen in FIG. 5 has its propellant casings (when in the operative position of FIG 2) emitting flow into a common annular exhaust chamber 50 which leads to a convergent nozzle passage 52 formed by the convergent outer nozzle casing 54 and the annular plug 56. Here again the advantage of the individual rocket casings arrangement in an annular fashion has advantage for assembly of prefabricated parts at the launching site.

In the assembled condition, as seen in FIG. 2, the outer rocket unit 14 is ignited first and acts as the first stage booster. The exhaust gases flowing from the outer unit 14 are presented essentially with a substantially contoured plug nozzle arrangement. The protrusion or annular plug 56 and the adjacent downstream converging wall portion 46 of the inner unit nozzle casing and the trailing edge portion 60 of the plug 42 all form a substantially continuous expansion surface. This streamlined perspective is also readily discernible as viewed in FIG. 1.

After the first stage burnout the inner rocket unit 12 is ignited and will separate from the unit 14 so that this separated arrangement would appear somewhat like the showing of combined FIGS. 4 and 5.

As a result of this invention it is apparent that very simple rocket elements can be fabricated at some central location and can be assembled at the launching site to form rockets of substantial size while maintaining the individual elements relatively small. Furthermore, the use of plug nozzles which operate efficiently over a wide range of pressure ratios presents a further essential advantage. In addition, the use of cooperating nozzle elements such that the inoperative second stage or inner rocket unit nozzle forms a portion of the first stage or outer unit nozzle thereby substantially reducing weight.

Although one embodiment of this invention has been illustrated and described, it will be apparent that various changes and modifications may be made in the arrangement and construction of the various parts without departing from the scope of this novel concept.

What it is desired to secure by Letters Patent is:

1. A multi-unit rocket including separate inner and outer rocket units, said inner unit having an exhaust nozzle wall extending aft of said outer unit, said wall converging in a downstream direction and forming a contoured aft expansion surface for the gases flowing from said outer unit, an outer wall for said outer unit defining an annular exhaust passage for said outer unit, a contoured annular protrusion in said annular exhaust passage having an aft extending-contoured surface cooperating with said expansion surface, and a contoured plug in said inner exhaust nozzle, said plug including an aft-extending converging surface forming a substantially expanding path for the gases flowing from said inner exhaust nozzle.

2. A multi-stage rocket comprising concentric coaxially disposed separate inner and outer rocket units, said inner unit having a power section of substantially uniform cross section and an exhaust nozzle receiving fluids from said power section, said nozzle having an outer wall converging in a downstream direction, a plug in said nozzle defining a convergent passage, said plug tapering in a downstream direction from its maximum dimension and protruding aft of the downstream end of said wall, said outer unit comprising an annular chamber and having an inner diameter substantially equal to the outer diameter of said inner unit, an annular exhaust nozzle receiving fluid from said annular chamber, said annular nozzle having an outer casing having a trailing edge portion converging in a downstream direction, said casing terminating upstream of the downstream end of said wall, said trailing edge and said downstream end of said wall and the aft end of said plug presenting a substantially continuous expansion surface to the fluid stream flowing thereover.

3. A rocket according to claim 2 wherein said inner unit is intended to be operated upon the exhaustion of power from said outer unit.

4. A rocket according to claim 3 wherein a payload is carried by said inner unit and said inner unit extends upstream of the upstream end of said outer unit.

5. A rocket according to claim 4 including a streamlined fairing spanning the radial space between the upstream ends of each of said units.

6. A multi-unit propulsion device comprising concentric coaxially disposed inner and outer rocket units, said inner unit having a power section of substantially constant cross section and an exhaust nozzle receiving fluids from said power section, said nozzle having an outer wall, a plug in said nozzle and defining a convergent passage, said plug tapering in a downstream direction from its maximum dimension and protruding aft of the downstream end of said wall, said outer unit comprising an annular chamber and having an inner diameter substantially equal to the outer diameter of said inner unit, an annular exhaust nozzle receiving fluid from said annular chamber, said annular nozzle having an outer casing having a trailing edge portion terminating upstream of the downstream end of said wall, said trailing edge and said downstream end of said wall and the aft end of said plug presenting a substantially continuous expansion surface to the fluid stream flowing from said annular nozzle.

7. A multi-unit propulsion device comprising concentric coaxially disposed inner and outer rocket units, said inner unit having a power section of substantially constant cross section and an exhaust nozzle receiving fluids from said power section, said nozzle having an outer wall, a plug in said nozzle defining a convergent passage, said plug tapering in a downstream direction from its maximum dimension and protruding aft of the downstream end of said wall, said outer unit comprising an annular chamber and having an inner diameter substantially equal to the outer diameter of said inner unit, an annular exhaust nozzle receiving fluid from said annular chamber, said annular nozzle having an outer casing having a trailing edge portion converging in a downstream direction, said casing terminating upstream of the downstream end of said wall, said trailing edge and said downstream end of said wall and the aft end of said plug presenting a substantially continuous expansion surface to the fluid stream flowing thereover and means for slidably mounting said inner unit with respect to said outer unit.

References Cited in the file of this patent

UNITED STATES PATENTS

| | | |
|---|---|---|
| 2,484,355 | Parsons | Oct. 11, 1949 |
| 2,589,548 | Imbert | Mar. 18, 1952 |
| 2,701,525 | Hickman | Feb. 8, 1955 |
| 2,724,237 | Hickman | Nov. 22, 1955 |
| 2,750,733 | Paris et al. | June 19, 1956 |
| 2,939,275 | Loedding | June 7, 1960 |
| 3,049,876 | Connors | Aug. 21, 1962 |

FOREIGN PATENTS

| | | |
|---|---|---|
| 74,261 | Netherlands | Mar. 15, 1954 |
| 1,003,758 | France | Nov. 21, 1951 |
| 773,190 | Great Britain | Apr. 24, 1957 |
| 353,566 | Italy | Oct. 21, 1937 |
| 353,586 | Italy | Oct. 21, 1937 |